United States Patent
Kano

(10) Patent No.: US 10,148,768 B2
(45) Date of Patent: Dec. 4, 2018

(54) INFORMATION PROCESSING APPARATUS AND RECORDING MEDIUM

(71) Applicant: KONICA MINOLTA, INC., Chiyoda-ku (JP)

(72) Inventor: Takahiro Kano, Toyonaka (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 798 days.

(21) Appl. No.: 14/305,175

(22) Filed: Jun. 16, 2014

(65) Prior Publication Data
US 2014/0379917 A1 Dec. 25, 2014

(30) Foreign Application Priority Data

Jun. 20, 2013 (JP) ................................ 2013-129969

(51) Int. Cl.
*H04L 29/08* (2006.01)
*H04L 29/06* (2006.01)
*H04N 1/00* (2006.01)

(52) U.S. Cl.
CPC ............ *H04L 67/142* (2013.01); *H04L 63/08* (2013.01); *H04N 1/00127* (2013.01)

(58) Field of Classification Search
None
See application file for complete search history.

(56) References Cited

U.S. PATENT DOCUMENTS

| 6,959,420 B1* | 10/2005 | Mitchell ............. G06F 21/6245 709/224 |
| 2011/0072223 A1* | 3/2011 | Jain ........................ H04L 67/02 711/159 |
| 2011/0239124 A1 | 9/2011 | Tsujimoto |

(Continued)

FOREIGN PATENT DOCUMENTS

| JP | 2005-099901 A | 4/2005 |
| JP | 2005-339454 | 12/2005 |
| JP | 2011-206962 A | 10/2011 |

OTHER PUBLICATIONS

Notice of Reasons for Refusal issued in corresponding Japanese Patent Application No. 2013-129969; dated Apr. 21, 2015, and English translation thereof.

*Primary Examiner* — Natisha D Cox
(74) *Attorney, Agent, or Firm* — Buchanan Ingersoll & Rooney PC

(57) ABSTRACT

An information processing apparatus capable of displaying information acquired by accessing a web server, by using a web browser, includes a communication control part for receiving a cookie write request from an access destination accessed by the web browser, a discrimination part for discriminating whether the cookie write request is sent from the first type of access destination or from a second type of access destination, and a cookie control part for controlling processing on a cookie shared by a plurality of users. The cookie control part performs write operation of a predetermined cookie when the cookie control part receives the (Continued)

cookie write request from the second type of access destination. The cookie control part deletes the predetermined cookie at a timing when access to the second type of access destination is ended with access transition from the second type of access destination to the first type of access destination.

15 Claims, 9 Drawing Sheets

(56) References Cited

U.S. PATENT DOCUMENTS

| | | | |
|---|---|---|---|
| 2014/0057596 A1* | 2/2014 | Brill | H04L 63/126 455/410 |
| 2014/0108667 A1* | 4/2014 | Reddy | G06F 17/30873 709/228 |
| 2014/0189808 A1* | 7/2014 | Mahaffey | H04L 63/083 726/4 |

\* cited by examiner

| | CONTROL METHOD (CONTROL TECHNIQUE) |
|---|---|
| APPLICATION AP1 | CONTROL METHOD CM1 |
| APPLICATION AP2 | CONTROL METHOD CM2 |
| APPLICATION AP3 | CONTROL METHOD CM1 |

⋮

INFORMATION PROCESSING APPARATUS AND RECORDING MEDIUM

This application is based on Japanese Patent Application No. 2013-129969 filed on Jun. 20, 2013, the contents of which are hereby incorporated by reference.

BACKGROUND OF THE INVENTION

Field of the Invention

The present invention relates to an information processing apparatus such as an MFP (Multi-Functional Peripheral) and its relevant technique.

Description of the Background Art

When network communication is performed between an information processing apparatus and a web server by using a web browser, a cookie is sometimes sent from the web server to the information processing apparatus, to be written into the information processing apparatus (see Japanese Patent Application Laid Open Gazette No. 2005-99901 (Patent Document 1)). The cookie includes various information including authentication information and the like. By using the cookie including the authentication information, for example, re-login can be omitted, and so on.

Recently, an MFP or the like serving as an image forming apparatus is provided with a web browser (hereinafter, referred to simply as a browser), and can communicate with various web servers (hereinafter, referred to simply as servers). Further, the MFP also serves as an information processing apparatus for transmitting and receiving information to/from various servers to process the information or as an information processing apparatus (information display apparatus) capable of displaying information acquired from a server by using a browser.

A browser of the MFP is capable of communicating with a server (external server) provided outside the MFP and also capable of communicating with a server (internal server) provided inside the MFP.

For example, in the communication between the browser of the MFP and the external server, it is possible for the browser of the MFP to access the external server (such as an external server providing an information management service or the like). In more detail, the communication in which a document (document data) is sent to the external server providing the information management service via a network and/or a document stored in the external server is received via a network, or the like can be performed.

In the communication between the browser of the MFP and the internal server of the MFP, the browser can acquire information in the MFP via the internal server and display the acquired information on a window screen thereof. In more detail, the browser of the MFP can acquire information on various set items or the like of the MFP from the MFP (specifically, a storage part inside the MFP) via the internal server of the MFP and display thereon a menu screen on the set items of the MFP. In other words, by using the browser, it is possible to form a menu screen or the like on the set items of the MFP.

A cookie in the browser of the MFP can be used in the communication with the external server and can be also used in the communication with the internal server as discussed above.

Further, the MFP is often shared by a plurality of users. The MFP is sometimes shared, for example, by a plurality of users and the like in a company. Then, also in the MFP shared by a plurality of users, a communication operation using a browser, or the like, is performed.

In a situation where a plurality of users use one MFP to utilize an information management service in an external server, a cookie including authentication information or the like is sent from the external server and stored into the MFP.

When a user UA accesses an information management service by using a browser of an MFP and inputs authentication information to perform an authentication operation to a server providing the information management service, a cookie including the authentication information is sent to the MFP from the server providing the information management service and stored into the MFP.

If the cookie is left without doing anything, however, such a false authentication problem as discussed below occurs. Specifically, after the user UA uses the cookie, when another user (e.g., UB) uses the browser of the MFP to access the server providing the same information management service (within the cookie lifetime), the cookie stored for the user UA is referred to. As a result, the user UB is allowed to access the server by using the authentication information included in the cookie for the user UA (the authentication information for the user UA). In other words, although not the user UA, the user UB is wrongly authenticated as the user UA and allowed to make access as the user UA.

In order to avoid such a false authentication problem, using, for example, the technique of Patent Document 1 may be possible.

In Patent Document 1, shown is a technique of deleting a cookie stored in a RAM inside a mobile phone during execution of a browser when a user of the mobile phone performs an end operation of the browser. By using the technique, as the cookie is deleted after the browser is ended, it is possible to suppress leakage of the authentication information or the like in the cookie.

When transmission and reception of data is performed between an information processing apparatus and a plurality of servers, the information processing apparatus receives a plurality of cookies transmitted individually from a plurality of servers and stores the plurality of cookies therein.

When the technique of Patent Document 1 is used in such a situation, however, the plurality of cookies sent from the plurality of servers and stored in the information processing apparatus are uniformly deleted. In a case, for example, where the MFP communicates with both the internal server and the external server, both the cookie from the internal server and that from the external server are uniformly deleted. Therefore, even if the information in the cookie from the internal server can be shared, the cookie from the internal server is deleted. Thus, it is difficult to take careful measures in accordance with the servers of communication destinations.

SUMMARY OF THE INVENTION

It is an object of the present invention to provide a technique for allowing an appropriate user management while effectively using relatively a small number of cookies mutually between a plurality of users and taking careful measures in accordance with servers of communication destinations.

The present invention is intended for an information processing apparatus capable of displaying information acquired by accessing a web server, by using a web browser. According to a first aspect of the present invention, the information processing apparatus includes a registration part for registering a first type of access destination, a communication control part for receiving a cookie write request from an access destination accessed by the web browser, a discrimination part for discriminating whether the cookie write request is sent from the first type of access destination or from a second type of access destination which is an access destination corresponding to a domain which is different from a domain of an access destination registered as the first type of access destination in advance, and a cookie control part for controlling processing on a cookie shared by a plurality of users in accordance with a discrimination result of the discrimination part, and in the information processing apparatus of the present invention, the cookie control part performs write operation of a predetermined cookie in response to the cookie write request when the cookie control part receives the cookie write request from the second type of access destination, and the cookie control part deletes the predetermined cookie which is once written into the information processing apparatus by the write operation, at a timing when access to the second type of access destination is ended with access transition from the second type of access destination to the first type of access destination.

The present invention is also intended for a non-transitory computer-readable recording medium. According to a second aspect of the present invention, the non-transitory computer-readable recording medium records therein a program to be executed by a computer embedded in an information processing apparatus which is capable of displaying information acquired by accessing a web server, by using a web browser, to cause the computer to perform the steps of a) receiving a cookie write request from an access destination accessed by the web browser, b) discriminating whether the cookie write request is sent from a first type of access destination or from a second type of access destination which is an access destination corresponding to a domain which is different from a domain of an access destination registered as the first type of access destination in advance, and c) controlling processing on a cookie shared by a plurality of users in accordance with a discrimination result in the step b), and in the non-transitory computer-readable recording medium of the present invention, the step c) has the steps of c-1) executing write operation of a predetermined cookie in response to a cookie write request when the cookie write request is received from the second type of access destination, and c-2) deleting the predetermined cookie which is once written into the information processing apparatus by the write operation, at a timing when access to the second type of access destination is ended with access transition from the second type of access destination to the first type of access destination.

According to a third aspect of the present invention, the information processing apparatus capable of displaying information acquired by accessing a web server, by using a web browser, includes a registration part for registering a first type of access destination, a communication control part for receiving a cookie write request from an access destination accessed by the web browser, a discrimination part for discriminating whether the cookie write request is sent from the first type of access destination or from a second type of access destination which is an access destination corresponding to a domain which is different from a domain of an access destination registered as the first type of access destination in advance, and a cookie control part for controlling processing on a cookie shared by a plurality of users in accordance with a discrimination result of the discrimination part, and in the information processing apparatus of the present invention, the cookie control part rejects the cookie write request when the cookie write request is determined to be sent from the second type of access destination.

According to a fourth aspect of the present invention, the non-transitory computer-readable recording medium records therein a program to be executed by a computer embedded in an information processing apparatus which is capable of displaying information acquired by accessing a web server, by using a web browser, to cause the computer to perform the steps of a) receiving a cookie write request from an access destination accessed by the web browser, b) discriminating whether the cookie write request is sent from a first type of access destination or from a second type of access destination which is an access destination corresponding to a domain which is different from a domain of an access destination registered as the first type of access destination in advance, and c) controlling processing on a cookie shared by a plurality of users in accordance with a discrimination result in the step b), and in the non-transitory computer-readable recording medium of the present invention, the step c) has the step of c-1) rejecting the cookie write request when the cookie write request is determined to be sent from the second type of access destination.

According to a fifth aspect of the present invention, the information processing apparatus capable of displaying information acquired by accessing a web server, by using a web browser, includes a registration part for registering a first type of access destination, a communication control part for receiving a cookie write request from an access destination accessed by the web browser, a discrimination part for discriminating whether the cookie write request is sent from the first type of access destination or from a second type of access destination which is an access destination corresponding to a domain which is different from a domain of an access destination registered as the first type of access destination in advance, a cookie control part for controlling processing on a cookie shared by a plurality of users in accordance with a discrimination result of the discrimination part, and a storage part for storing a data table which selectively specifies a first control technique and a second control technique as a control technique to be executed correspondingly to each of a plurality of applications using the web browser, and in the information processing apparatus of the present invention, the first control technique is a control to perform write operation of a predetermined cookie in response to the cookie write request when the cookie write request from the second type of access destination is received, and to delete the predetermined cookie which is once written into the information processing apparatus by the write operation at a predetermined timing after access to the second type of access destination is ended, the second control technique is a control to reject the cookie write request when the cookie write request is determined to be a request from the second type of access destination, and the cookie control part performs processing on the cookie by selectively using a control technique registered in the data table in association with an application being executed, among the first control technique and the second control technique, when the cookie write request is determined to be sent from the second type of access destination.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a view showing a data table indicating a control method for each application.

DESCRIPTION OF THE PREFERRED EMBODIMENTS

Hereinafter, with reference to figures, discussion will be made on the preferred embodiments of the present invention.

<1. The First Preferred Embodiment>

<1-1. Overview of System Configuration>

Figure 1:
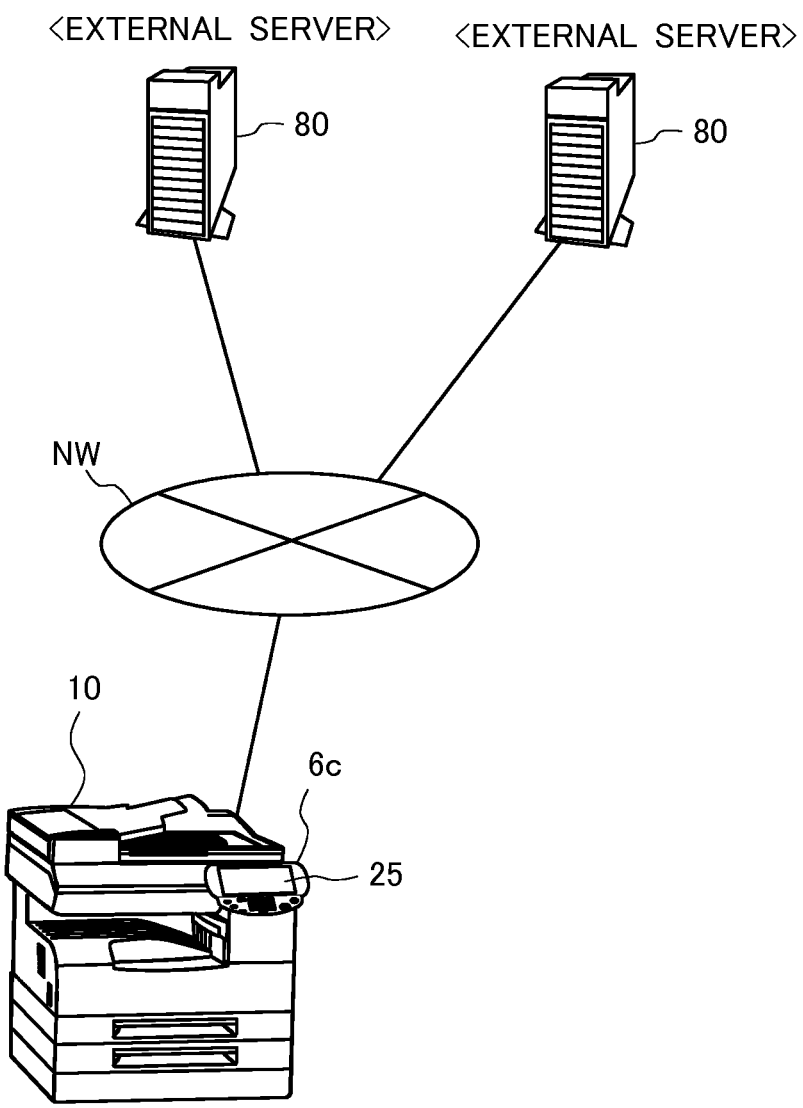
FIG. 1 is a view showing an image forming system (information display system)

FIG. 1 is a view showing an image forming system 1 in accordance with the first preferred embodiment of the present invention. As shown in FIG. 1, the image forming system 1 comprises an image forming apparatus 10 and an external server 80.

The respective constituent elements 10 and 80 in the image forming system 1 are communicably connected to each other via a network NW. The network NW includes a LAN (Local Area Network), the internet, and the like. The connection between each of the constituent elements and the network NW may be a wired connection or a wireless connection.

The image forming apparatus 10 has a network connection function (internet connection function or the like). By using the network communication function, the image forming apparatus 10 can upload and store various files (data files) to/into the external server 80 and download and acquire the files stored in the external server 80. As the external server 80, a web server providing a commercial (external) information management service, or the like, may be used.

<1-2. Constitution of Image Forming Apparatus>

In the present preferred embodiment, as the image forming apparatus 10, an MFP (Multi-Functional Peripheral) is taken as an example. Since the MFP 10 is an apparatus for processing various information, the MFP 10 is also referred to as an information processing apparatus. Further, since the MFP 10 is an apparatus capable of displaying various information, the MFP 10 is also referred to as an information display apparatus or the like. Similarly, the image forming system 1 is also referred to as an information processing system, an information display system, or the like.

Figure 2:
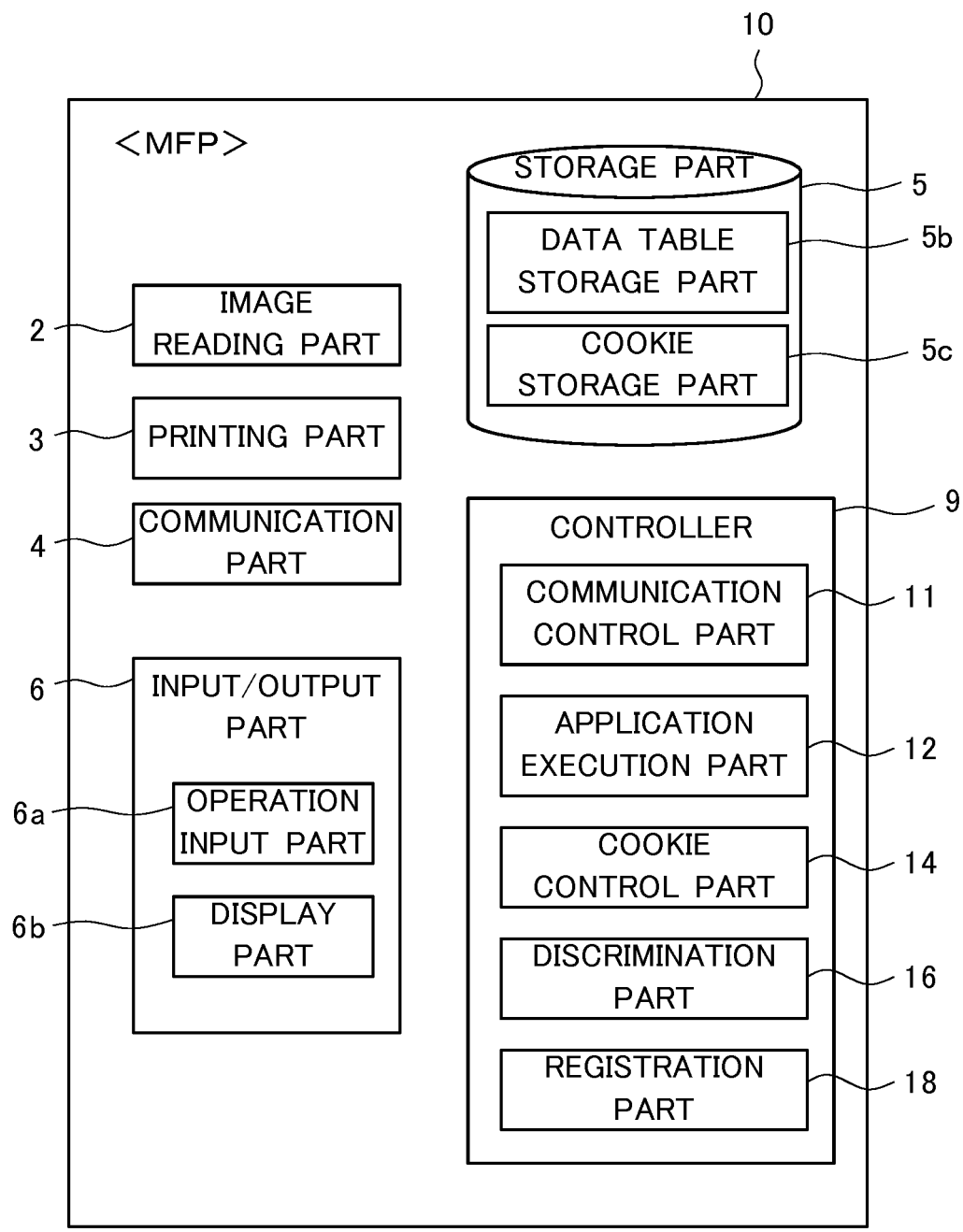
FIG. 2 is a functional block diagram showing a schematic constitution of an MFP.

FIG. 2 is a functional block diagram showing a schematic constitution of the MFP 10.

The MFP 10 is an apparatus (also referred to as a multifunction machine) having a scanner function, a copy function, a facsimile function, a box storage function, and the like. Specifically, as shown in the functional block diagram of FIG. 2, the MFP 10 comprises an image reading part 2, a printing part 3, a communication part 4, a storage part 5, an input/output part 6, a controller 9, and the like and multiply uses these constituent parts to implement various functions.

The image reading part 2 is a processing part which optically reads (in other words, scans) an original manuscript placed on a predetermined position of the MFP 10 and generates image data of the original manuscript (also referred to as an "original manuscript image" or a "scan image"). The image reading part 2 is also referred to as a scanning part.

The printing part 3 is an output part which prints out an image to various media such as paper on the basis of the data on an object to be printed.

The communication part 4 is a processing part capable of performing facsimile communication via public networks or the like. Further, the communication part 4 is capable of performing network communication via the network NW. The network communication uses various protocols such as TCP/IP (Transmission Control Protocol/Internet Protocol) and the like. By using the network communication, the MFP 10 can transmit and receive various data to/from desired partners.

The storage part 5 is a storage unit such as a hard disk drive (HDD) or/and the like. The storage part 5 stores therein image data and the like. Further, the storage part 5 can store an access history of a browser BW (described later) operating in the MFP 10, cookies received from various servers through the browser BW, and the like as occasion arises. The cookies are stored in a cookie storage part 5c in the storage part 5. A storage operation (write operation) of the cookie will be discussed later in detail.

The input/output part 6 comprises an operation input part 6a for receiving an input which is given to the MFP 10 and a display part 6b for displaying various information thereon. The MFP 10 is provided with a substantially plate-like operation panel part 6c (see FIG. 1) and the operation panel part 6c has a touch panel 25 (see FIG. 1) on its front side. The touch panel 25 is a liquid crystal display panel in which a piezoelectric sensor or the like is embedded and can both display various information and receive an operation input from an operator. In the touch panel 25, for example, displayed are various screens such as a menu screen and the like (including button images and the like) or the like. The operator can press virtually-arranged buttons (represented by the button images) in the touch panel 25 to set various operation contents of the image forming apparatus 10. The touch screen 25 serves as part of the operation input part 6a and also serving as part of the display part 6b.

The controller 9 is a control unit for generally controlling the MFP 10. The controller 9 is a computer system which is embedded in the MFP 10 and comprises a CPU, various semiconductor memories (RAM and ROM), and the like. The controller 9 causes the CPU to execute a predetermined software program (hereinafter, also referred to simply as a "program") PG1 stored in the ROM (e.g., EEPROM), to thereby implement various processing parts. Further, the program PG1 may be recorded in various portable (in other words, non-transitory) computer-readable recording media such as a USB memory or the like and read out from the recording medium to be installed in the MFP 10. Alternatively, the program PG1 may be downloaded via the network NW or the like to be installed in the MFP 10.

Further, in the program PG, a plurality of application programs (hereinafter, referred to simply as applications) AP (AP1, AP2, and the like) are called up and executed. As such applications, an internal coordination application or the like is taken as an example.

The internal coordination application is an application coordinated with an internal server 30 (FIG. 3) provided inside the image forming apparatus 10 and is also referred to as an internal server coordination application. As the internal coordination application, for example, an application coordinated with the internal server 30, for accessing an information management service (Evernote (trademark), Dropbox (trademark), and the like) provided by a particular external server, or the like is taken as an example. In more detail, a particular address in the internal server 30 is first registered as a first access destination (first type of access destination AC1), and the application accesses the particular address by using a web browser (referred to simply as a browser) BW. Then, the application displays a first screen on the web browser BW in the MFP 10 on the basis of display data stored at the particular address (display data described by HTML (HyperText Markup Language) or the like). Then, in accordance with an operation of a user, the application accesses a server (external server 80) providing an information management service on the basis of information on an access destination (in more detail, URL (Uniform Resource Locator) of the access destination) (second type of access destination AC2) stored in the application, to perform an authentication operation. When the authentication operation is completed, the application is returned into an access state to the internal server 30 again.

Thus, the application AP is a program for accessing the first type of access destination AC1 and the second type of access destination AC2 by using the web browser BW.

The program PG1 changes processing in response to a cookie write request in accordance with the two types of access destinations AC1 and AC2 (herein, the internal server 30 and the external server 80) accessed by the application AP. Specifically, a normal cookie control process CT1 is performed in response to the cookie write request from the internal server 30, and such a cookie control process CT2 as discussed later is performed in response to the cookie write request from the external server 80.

As shown in FIG. 2, the controller 9 executes the program PG1 or the like, to thereby implement various processing parts including a communication control part 11, an application execution part 12, a cookie control part 14, a discrimination part 16 and a registration part 18.

The application execution part 12 is a processing part for executing the application specified by the operator (referred to also as a specified application) (e.g., the internal coordination application AP1).

The registration part 18 is a processing part for registering the first type of access destination AC1 (in detail, its URL) prior to start of execution of the application. As the URL which the application AP1 is to first access, for example, the URL (e.g., http://129.0.0.1:8090/iws/app1/index.html/) of the internal server 30 is registered into the MFP 10 (the storage part 5) in advance in response to an operation input or the like of the operator.

The communication control part 11 is a processing part for controlling a communication operation with other apparatus(es) in cooperation with the communication part 4 and the like. The communication control part 11 receives the cookie write request from the access destination by the browser BW via a communications network during execution of the application AP or the like.

The discrimination part 16 is a processing part for discriminating whether the access destination by the browser BW is the first type of access destination AC1 or the second type of access destination AC2. In other words, the discrimination part 16 discriminates whether the cookie write request WQ received by the communication control part 11 is sent from the first type of access destination AC1 or from the second type of access destination AC2.

Herein, it is assumed that as the first type of access destination AC1, the URL of the internal server 30 is registered into the MFP 10 (the storage part 5) prior to the execution of the internal coordination application AP1. The URL registered in the MFP 10 as the first type of access destination AC1 is determined as the first type of access destination AC1 by the discrimination part 16. Further, a URL having the same domain as that of the registered URL (herein, the domain "localhost" of the internal server 30) is also determined as the first type of access destination AC1. In other words, the cookie write request WQ sent from the URL registered as the first type of access destination or the URL having the same domain as that of the registered URL is determined to be sent from the first type of access destination AC1.

On the other hand, a URL (e.g., URL having a domain of an external server such as "www.***.com" or the like) having a domain different from the domain of the first type of access destination AC1 is determined to be the second type of access destination AC2. Specifically, an access destination having a domain different from the domain of the first type of access destination AC1 is determined to be the second type of access destination AC2. In other words, the cookie write request WQ sent from an access destination having a domain different from the domain of the first type of access destination AC1 is determined to be sent from the second type of access destination AC2. When a plurality of access destinations (a plurality of URLs) are registered as the first type of access destination AC1, a URL having a domain different from any of the domains of the plurality of registered access destinations AC1 may be determined to be the second type of access destination AC2.

The cookie control part 14 is a processing part for controlling processing on a cookie shared by a plurality of users. Specifically, the cookie control part 14 controls a response operation to the cookie write request WQ from a server of a communication destination through the browser BW, or the like, in accordance with the above discrimination result by the discrimination part 16. An outline of such control will be discussed with reference to FIG. 3 and the like.

Figure 3:
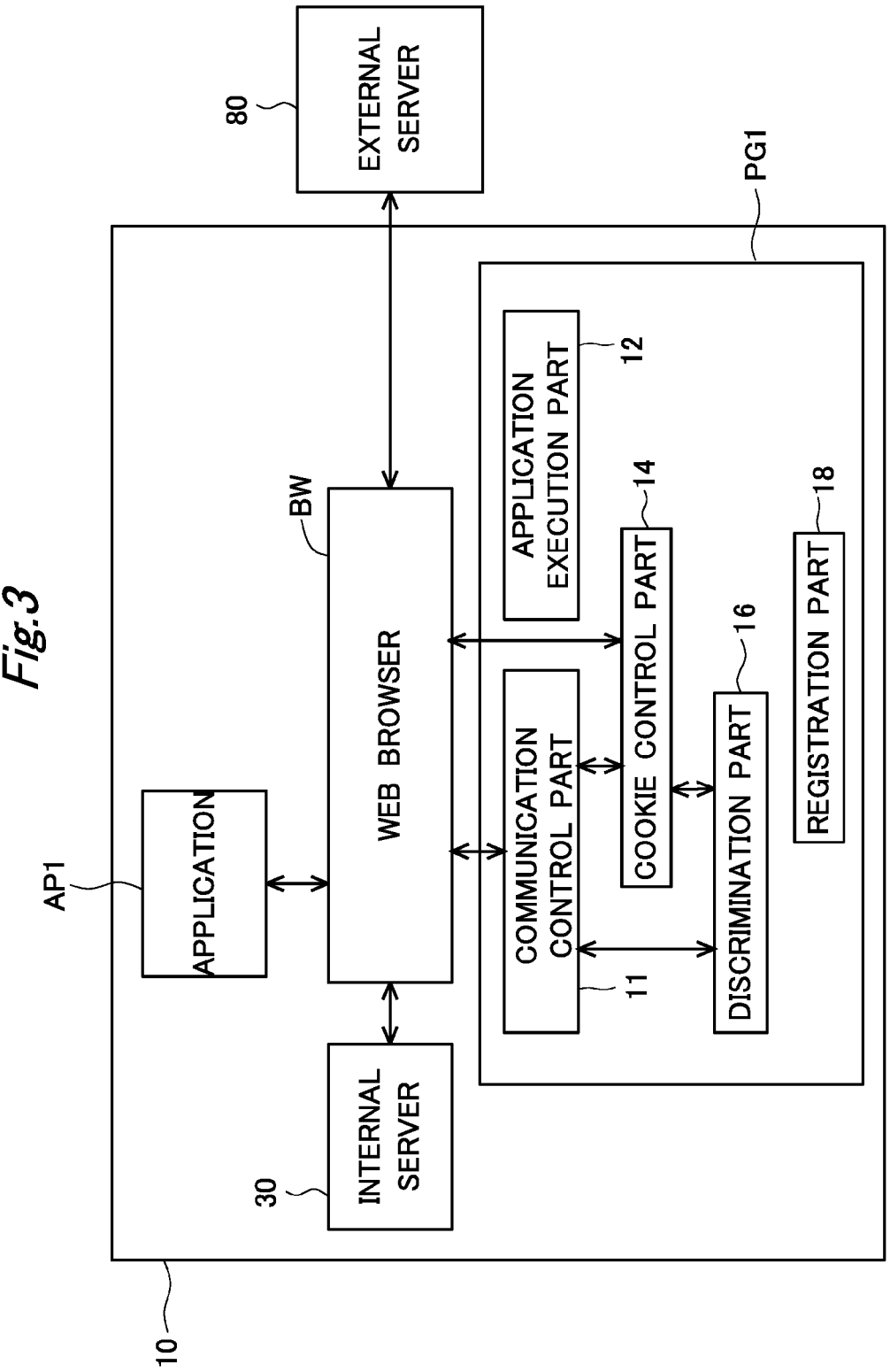
FIG. 3 is a view showing a program structure and the like of the MFP.

FIG. 3 is a view showing a program structure and the like of the image forming apparatus 10.

As shown in FIG. 3, the application AP1 communicates with the inner web server (referred to simply as an internal server) 30 through the web browser (referred to simply as a browser) BW. The application AP1 uses HTTP (HyperText Transfer Protocol), a script (described by a script language such as PYTHON or the like) and the like to perform various processings in coordination with the internal server 30. Further, the application AP1 can access another server (e.g., the external server 80). This communication uses HTTP or the like.

Figure 6:
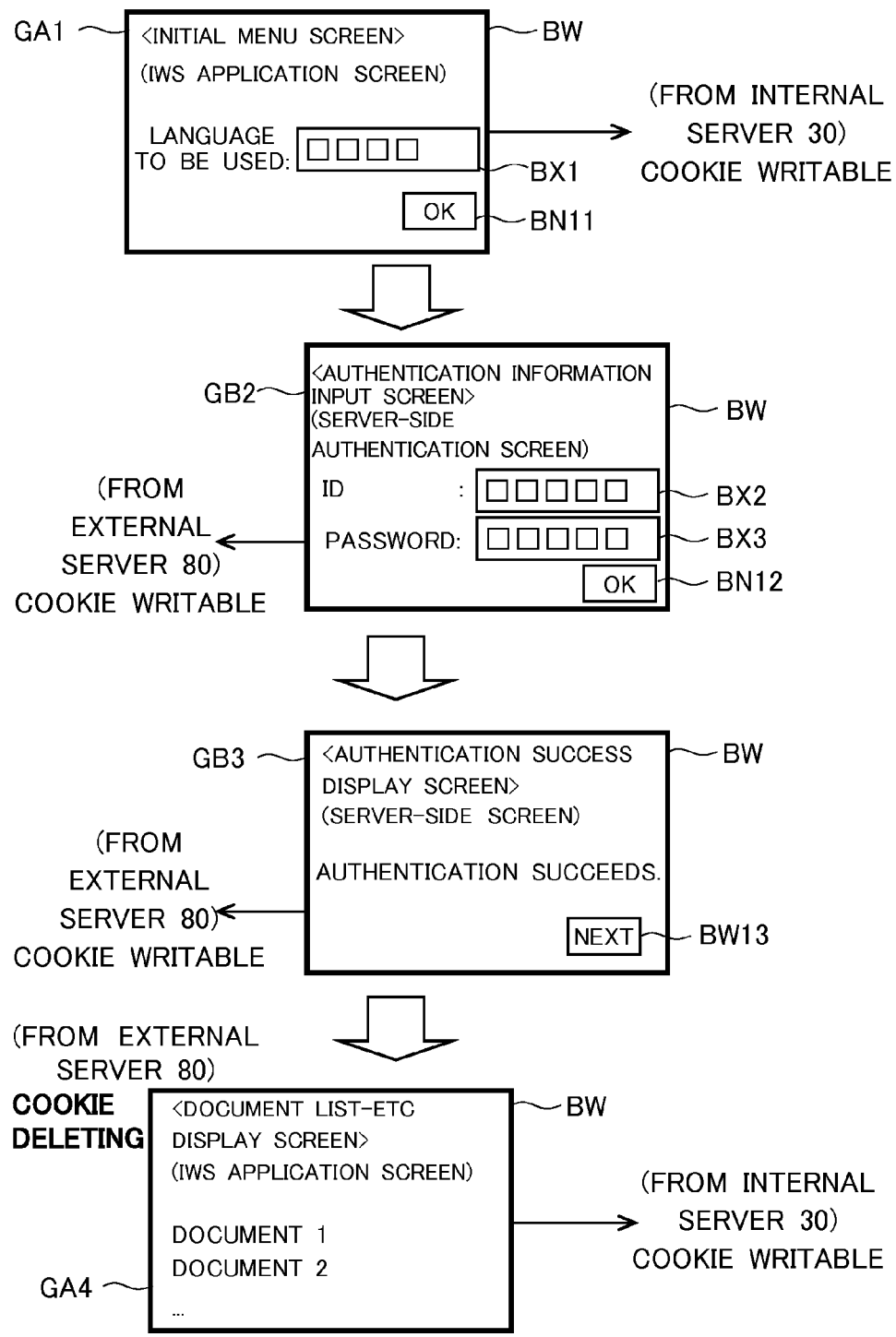
FIG. 6 is a view showing a screen transition and the like in accordance with a first preferred embodiment.

Screens GA1 and GA4 (see FIG. 6) described later are displayed on the touch panel 25 when the application AP1 coordinates with the internal server 30 by using the browser BW. In more detail, the registered address (URL) (first type of access destination AC1) for the internal server 30 is referred to, and each of the screens (GA1, GA4, and the like) is displayed by using display data (data described by HTML, or the like) stored at the registered address (e.g., a predetermined address (URL) in the storage part 5 of the image forming apparatus 10).

Further, screens GB2 and GB3 described later are displayed on the touch panel 25 when the application AP1 coordinates with the external server 80 by using the browser BW. In more detail, the access destination stored in the application AP1 in advance (in detail, a URL indicating a predetermined folder or the like in the external server 80) (second type of access destination AC2) is referred to, and each of the screens (GB2, GB3, and the like) is displayed by using display data (HTML data, image data, and the like) stored at the URL (e.g., a predetermined address in a storage part of the external server 80).

During a display period for each of the above screens GA1, GB2, GB3, GA4, and the like, the MFP 10 receives the cookie write request WQ from each of the plurality of access destinations through the browser BW. The plurality of access destinations transmit individual instructions (write requests) WQ indicating unique cookies (different types of cookies) to be written to the MFP 10. When the MFP 10 receives the cookie write requests WQ from respective access destinations, the cookies which are different from one another by the requesters (access destinations) of the cookie write requests WQ can be stored in the cookie storage part 5c by the browser BW. In response to the cookie write request WQ from the first type of access destination AC1, for example, a cookie CA is written. On the other hand, in response to the cookie write request WQ from the second type of access destination AC2, for example, a cookie CB is written.

When such a cookie write request WQ is received, the cookie control part 14 controls processing on the cookie on the basis of the above discrimination result or the like by the discrimination part 16 as follows.

Figure 4:
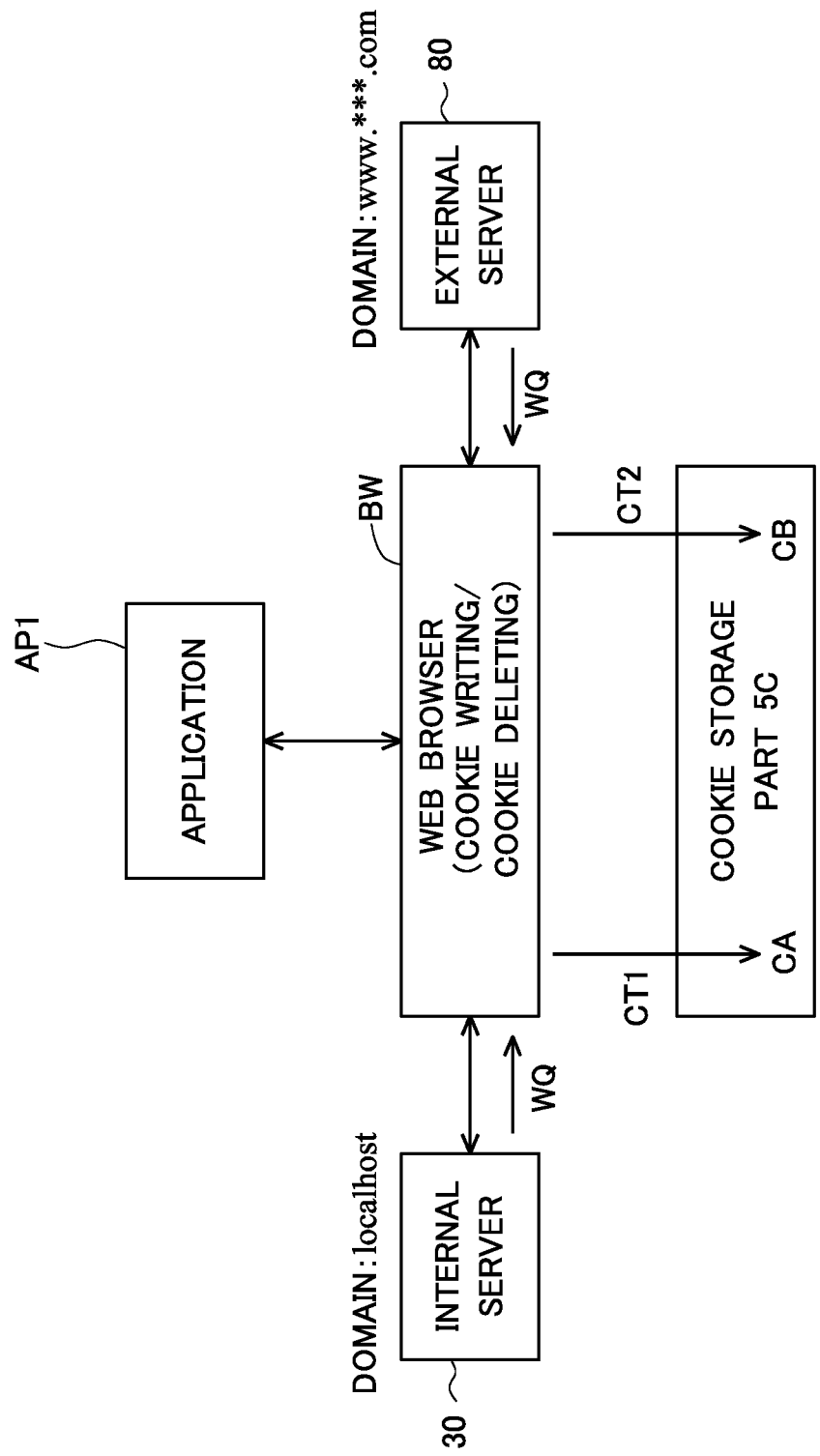
FIG. 4 is a view showing a cookie and the like used in a web browser.

Specifically, the cookie control part 14 performs the normal cookie control process CT1 in response to the cookie write request WQ from the internal server 30. More specifically, a cookie write permission is given to the cookie write request WQ from the internal server 30, and the cookie CA is stored in the MFP 10 (see FIG. 4).

Information to be stored in the cookie CA stored in the MFP 10 in response to the write request from the internal server 30 can be customized as appropriate by a provider of the MFP 10 (or provider of the application AP) or the like. Herein, the cookie CA is customized in a form of having pieces of selection information of a plurality of users as independent information.

In the cookie CA from the internal server 30 (exactly, the cookie CA written in response to the cookie write request WQ from the internal server 30), an user identifier (user name, user ID, and the like) and predetermined information (e.g., selected language information and the like) are stored in pairs (in association with each other). In the cookie CA, for example, stored are selected language information for a plurality of users, respectively. In more detail, in the cookie CA, stored are "Japanese" which is a selected language of the user UA and a user identifier of the user UA in association with each other, and "English" which is a selected language of the user UB and a user identifier of the user UB in association with each other.

On the other hand, the cookie control part 14 performs the cookie control process CT2 which is different from the normal cookie control process CT1, in response to the cookie write request WQ from the external server 80. Specifically, in the first preferred embodiment, a cookie write permission is once given to the cookie write request WQ from the external server 80, and the cookie CB is once stored (written) in the MFP 10 (see FIG. 4). After that, however, the cookie CB is deleted at a predetermined timing after the access to the external server 80 is ended.

Items of information (specification of the cookie) included in the cookie CB used in the external server 80 are determined by the provider of the information management service through the external server 80, and the like. Specifically, information to be stored in the cookie CB stored in the MFP 10 in response to the write request from the external server 80 cannot be customized by the provider of the MFP 10 (or provider of the application AP) or the like.

Herein, it is assumed that the cookie CB has a form of having selection information of a single user. In the cookie CB from the external server 80 (exactly, the cookie CB written in response to the cookie write request WQ from the external server 80), stored is only predetermined information of the single user (a fact that a user having a particular user ID is authenticated, and the authentication validity time). In the cookie CB, individual information for a plurality of users (information for each user) cannot be stored in distinction to one another.

In the first preferred embodiment, a case will be considered where there arises some problem if the cookie CB written in response to the cookie write request WQ from the external server 80 is shared by a plurality of users while there arises no problem if the cookie CA written in response to the cookie write request WQ from the internal server 30 is shared by a plurality of users.

Specifically, as discussed above, it is assumed that the cookie CA stored in response to the write request from the first type of access destination AC1 is a cookie in which predetermined information MA (e.g., selected language information) is held therein for each user. More specifically, it is assumed that the cookie CA has a form of storing a plurality of users and respective pieces of selected language information of the plurality of users in association with each other, the application AP1 discriminates the plurality of users from one another and can correctly recognize the information MA for each user. In this case, there arises no such problem as discussed above if the cookie CA is shared by the plurality of users. Though the case where the information MA held in the cookie CA is "selected language information" (non-security information) is taken as an example in the first preferred embodiment, this is one exemplary case and the information MA may be security information such as authentication information.

On the other hand, it is assumed that the cookie CB stored in response to the write request from the second type of access destination AC2 is a cookie in which predetermined information MB (e.g., authentication information or the like) is held therein in no distinction of user. In other words, it is assumed that the cookie CB can store only information MB for a single user (cannot store predetermined information for a plurality of users). In this case, there arises such a false authentication problem as discussed above. Though the case where the information MB held in the cookie CB is "authentication information" (security information) is taken as an example in the first preferred embodiment, this is one exemplary case and the information MB may be non-security information.

In the MFP 10, there are an authentication mode and a non-authentication mode for login authentication to the MFP 10. The authentication mode is a mode in which only a user who is authenticated to be an official user when the user logs in to the MFP 10. In the authentication mode, a login user (in other words, a user who is using the MFP 10) is specified. On the other hand, the non-authentication mode is a mode in which a user can use the MFP 10 without any login operation (user authentication). In the non-authentication mode, a user who is using the MFP 10 is not specified.

Especially, in the "non-authentication mode" in the MFP 10, as the user is not specified, such a false authentication problem as discussed above is likely to occur.

Further, even if the user is specified in the "authentication mode", since the MFP 10 has limited hardware resource, it is not preferable that the cookie is provided for each user. In other words, it is preferable that a cookie from a particular URL should be shared by a plurality of users. Then, in a case where a cookie from a particular URL is shared by a plurality of users, there can arise such a false authentication problem as discussed above even in the authentication mode of the MFP.

Thus, whether the authentication mode or the non-authentication mode, when a cookie from a particular URL is shared by a plurality of users, there can arise such a false authentication problem as discussed above.

Hereinafter, discussion will continue assuming the situation where the MFP operates in the "non-authentication mode". The present invention is not limited to this case, however, but the idea of the present invention may be applied to an operation in the authentication mode of the MFP <1-3. Operation>

Next, discussion will be made on an operation of the image forming system 1 of the present invention. In the first preferred embodiment, a case will be discussed as an example where with execution of the application AP1, the access to the first type of access destination AC1 is first performed, then the access to the second type of access destination AC2 is performed, and after that, the access to the first type of access destination AC1 is performed again. As discussed later, in response to the cookie write request WQ from the second type of access destination AC2, the MFP 10 (the cookie control part 14 and the like) performs processing different from that in response to the cookie write request WQ from the first type of access destination AC1. Specifically, with the access transition from the second type of access destination AC2 to the first type of access destination AC1, the cookie CB from the second type of access destination AC2 is deleted at a timing when the access to the second type of access destination AC2 is ended.

Figure 5:
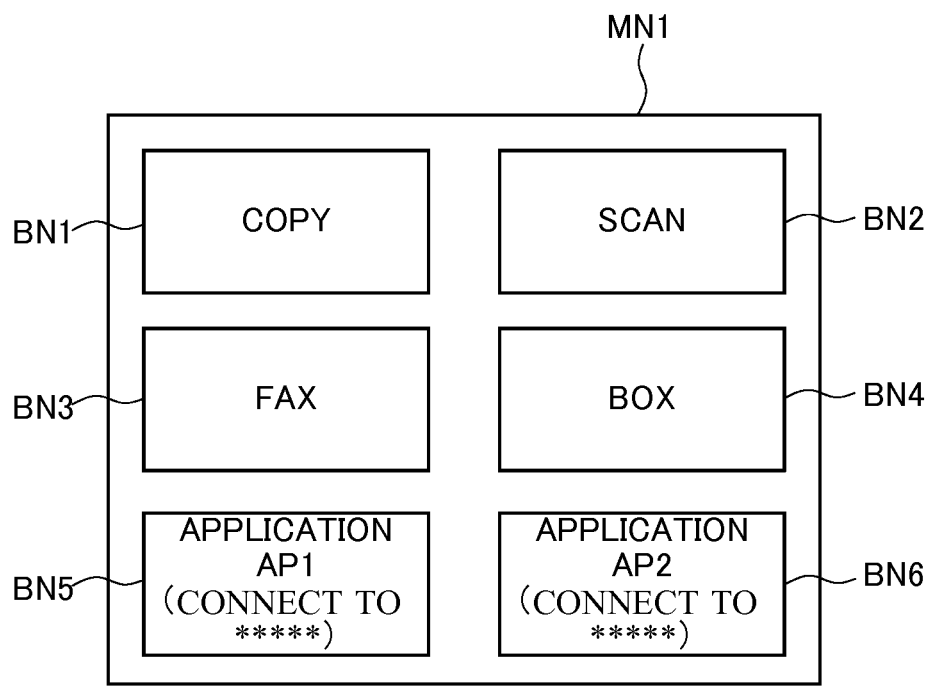
FIG. 5 is a view showing a menu screen.

First, in response to an operation of an operator (e.g., the user UA), a menu screen MN1 shown in FIG. 5 is displayed on the touch panel 25 of the MFP 10.

FIG. 5 is a view showing the menu screen MN1. The menu screen MN1 has a plurality of buttons such as a copy button BN1, a scan button BN2, a FAX button BN3, a box button BN4, application software program start buttons BN5, BN6, . . . , and the like. The buttons BN1 to BN4 are options prepared in advance in a default state and the buttons BN5, BN6, and the like are options which are additionally registered by the user. As the buttons BN5 and BN6, start buttons for various application software programs (also referred to simply as applications) AP (AP1, AP2, and the like) can be registered. As the application start button BN5, for example, a button for starting an application software AP1 for accessing an information management service (e.g., Evernote (trademark)) provided by a particular external server is registered.

The buttons BN5 and BN6 are registered by an operation of the user or the like prior to the display of the menu screen MN1 (and executions of the applications AP1 and AP2). In this registration, registered are the application itself (program itself) to be started, an icon of the application, a first access destination (in detail, its URL) at the start of the application, and the like. As the URL of the first access destination, for example, "http://129.0.0.18090/iws/app1/index.html/" is registered. The URL indicates the location of a predetermined file stored in a folder inside the internal server 30 indicated by the IP address "129.0.0.1" (hereinafter, referred to also as "localhost"). Thus, prior to the execution of the application AP1, the first type of access destination AC1 (in detail, its URL) is registered. Though the case is shown herein where the first type of access destination AC1 is registered in response to the user operation, this is one exemplary case. For example, the first type of access destination AC1 stored in the application AP1 may be automatically registered when the application AP1 is installed.

In such a menu screen MN1, when the user UA presses the button BN5, the application AP1 registered in association with the button BN5 is started up. The application AP1 for accessing a particular information management service, for example, is started up.

Then, a first screen GA1 (see the top stage of FIG. 6) after the start-up of the application AP1 is displayed on the touch panel 25. The screen GA1 is one of screens GA to be displayed in response to the access to the first type of access destination AC1 (herein, the internal server 30). In detail, the screen GA1 is displayed through the access to the internal server 30 via the browser BW. In more detail, the screen GA1 is displayed on the basis of display data (display data described by HTML or the like) transmitted from the internal server 30.

Herein, the screen GA1 serves as a selection screen or the like for selecting a language to be used in the application AP1. When the user UA selects a desired language to be used (e.g., "Japanese") in a drop-down list box BX1 and presses an OK button B11, the selection information is stored into the MFP 10 and managed by the application AP1.

During the display of the screen GA1, when the internal server 30 transmits the cookie write request WQ to the MFP 10, the cookie control part in the MFP 10 writes (stores) the cookie CA into the MFP 10 in response to the cookie write request WQ. For example, the cookie CA including a specification result (selection result) on the language to be used, and the like, is stored.

The discrimination part 16 in the MFP 10 determines the cookie write request WQ to be sent from the first type of access destination AC1 and holds the discrimination result (stored in response to the cookie write request WQ) in association with the cookie CA.

Next, the application AP1 uses the browser BW to access the second type of access destination AC2. Herein, as the second type of access destination AC2, an external address is taken as an example. The external address is an address (URL) stored in advance in the application AP1, whose domain (herein, an external domain of the MFP 10) (in detail, the external server 80) different from that of the internal server 30. As the external address, for example, a URL such as "https://www.*.com/login.action/" is taken as an example (herein "www.*.com" is a domain name of an information management service providing server or the like.

The application AP1 transmits an HTTP request to the external address by using the browser BW, to access the external server 80.

When the MFP 10 accesses the external server 80 (the second type of access destination AC2), an HTTP response (specifically, the display data) is transmitted from the external server 80 to the MFP 10 in response to the access. The MFP 10 displays a predetermined screen (herein, authentication screen) GB2 (the second screen from the top in FIG. 6) on the touch panel 25 (in detail, in a window of the browser BW) on the basis of the display data transmitted from the external server 80. The screen GB2 is one of screens GB to be displayed in response to the access to the second type of access destination AC2 (herein, the external server 80). The screen GB2 is displayed through the access to the external server 80 by using the browser BW. In more detail, the screen GB2 is displayed on the basis of the display data (display data described by HTML or the like) transmitted from the external server 80.

In the screen GB2, the user UA inputs authentication information (user ID, password, and the like). In detail, the user UA inputs the user ID into an input field BX2, inputs the password into an input field BX3, and presses an OK button BN12. In response to the input operation, the MFP 10 transmits the inputted authentication information to the external server 80.

The external server 80 performs an authentication operation on the basis of the authentication information. When the authentication succeeds, the external server 80 transmits the write request WQ for the cookie CB in which a fact that the authentication information is valid, and the like, is described, to the MFP 10 and also transmits display data for a screen GB3 (the third screen from the top in FIG. 6) to be displayed when the authentication succeeds to the MFP 10.

When the MFP 10 receives the cookie write request WQ from the external server 80, the MFP 10 performs write operation on the cookie CB in response to the cookie write request WQ. Further, when the MFP 10 receives the display data for the screen GB3, the MFP 10 displays the screen GB3 on the touch panel 25 (in the window of the browser BW) on the basis of the display data. The screen GB3 is also one of screens GB to be displayed in response to the access to the second type of access destination AC2 (herein, the external server 80). The screen GB3 is displayed through the access to the external server 80 by using the browser BW. In more detail, the screen GB3 is displayed on the basis of the display data (display data described by HTML or the like) transmitted from the external server 80.

The discrimination part 16 in the MFP 10 determines the cookie write request WQ to be sent from the second type of access destination AC2 and holds the discrimination result (stored in response to the cookie write request WQ) in association with the cookie CB.

After that, the user UA checks in the screen GB3 that the authentication succeeds and then presses a "Next" button BN13 in the screen GB3. In response to the press operation, the MFP 10 refers to a return destination address (the particular URL of the first type of access destination AC1) which is determined in advance and accesses the return destination address by using the browser BW. It is assumed herein that an address to be accessed immediately after the "Next" button BN13 is pressed is determined in advance as the return destination address. As the return destination address, for example, an address or the like which is notified in advance by the browser BW (and the external server 80) when the screen GA1 is changed to the screen GB2 may be used.

Then, in a screen GA4 displayed by accessing the return destination address, "document list information" acquired from the external server 80 is displayed in a unique form of the application AP1 (customized form). The screen GA4 is one of screens GA to be displayed in response to the access to the first type of access destination AC1 (herein, the internal server 30). The screen GA4 is displayed through the access to the internal server 30 by using the browser BW, or the like. In more detail, the screen GA4 is displayed on the basis of the "document list information" acquired from the external server 80 and display data (display data described by HTML or the like) transmitted from the internal server 30.

At that time, the cookie control part 14 deletes the cookie CB at a timing when the access to the second type of access destination AC2 with the access change (access transition) from the second type of access destination AC2 to the first type of access destination AC1. In more detail, the cookie CB which is determined to be stored in response to the cookie write request WQ from the second type of access destination AC2 on the basis of the discrimination result (the discrimination result of the discrimination part 16) held in association with each of the cookies CA and CB is deleted. On the other hand, the cookie CA which is determined to be stored in response to the cookie write request WQ from the first type of access destination AC1 is not deleted. Specifically, only the cookie CB among the cookies CA and CB is selectively deleted. It is thereby possible to prevent the cookie CB in which the information on the user UA is written from being used after that by other users (UB and the like).

After that, during the access to the first type of access destination AC1, the write operation of the cookie CA is performed as appropriate in screens after the screen GA4 in response to the cookie write request WQ from the internal server 30.

In the above operation, the access destination AC1 which is registered in advance as the first type of access destination is discriminated from the second type of access destination AC2 which is an access destination corresponding to the domain different from the domain of the first type of access destination AC1. Then, when the MFP 10 is used by the user UA, the write operation on the cookie CB is performed in response to the cookie write request WQ from the second type of access destination AC2 (the external server 80), and the cookie CB which is once written into the MFP 10 by the write operation is deleted at a predetermined timing after the access to the second type of access destination AC2 is ended. In more detail, with the access transition from the second type of access destination AC2 to the first type of access destination AC1, the cookie CB is deleted at the timing when the access to the second type of access destination AC2 is ended. Therefore, when the MFP 10 is used by other users (UB and the like) after that, the cookie CB has been already deleted, and it is thereby prevent the information stored in the cookie CB (e.g., the authentication information and the like) from being used by other users (UB and the like). In other words, in the case where the cookie CB from the external server 80 is shared by a plurality of users, it is possible to perform an appropriate user management. Thus, it is possible to perform an appropriate user management while effectively using relatively a small number of cookies mutually between a plurality of users.

Further, the cookie CB from the second type of access destination, among the cookie CA from the first type of access destination and the cookie CB from the second type of access destination, is selectively deleted. In other words, whether each of the cookies CA and CB should be deleted or not can be changed in accordance with the communication destination. Therefore, it is possible to take careful measures in accordance with the servers of the communication destinations (in more detail, information contents of the cookies determined for the servers of the communication destinations).

Especially, in the above preferred embodiment, the cookie CA has a form of being shared by a plurality of users while discriminating the users from one another. Then, since the cookie CA is not deleted and remains stored, the plurality of users can use their own information included in the cookie CA individually and appropriately. It is preferable that their own information stored in the cookie CA should be information (e.g., language information, information indicating the display form in the browser, and the like) other than the security information such as the authentication information.

<2. The Second Preferred Embodiment>

The second preferred embodiment is a variation of the first preferred embodiment, and the following discussion will be centered on the difference from the first preferred embodiment.

In the first preferred embodiment, as an example, the case has been discussed where the cookie CB is deleted at the timing when the access to the second type of access destination AC2 is ended, with the access transition from the second type of access destination AC2 to the first type of access destination AC1.

In the second preferred embodiment, as an example, a case will be discussed where the cookie CB is deleted at the timing when the access to the second type of access destination AC2 is ended, with end processing of the browser.

Figure 7:
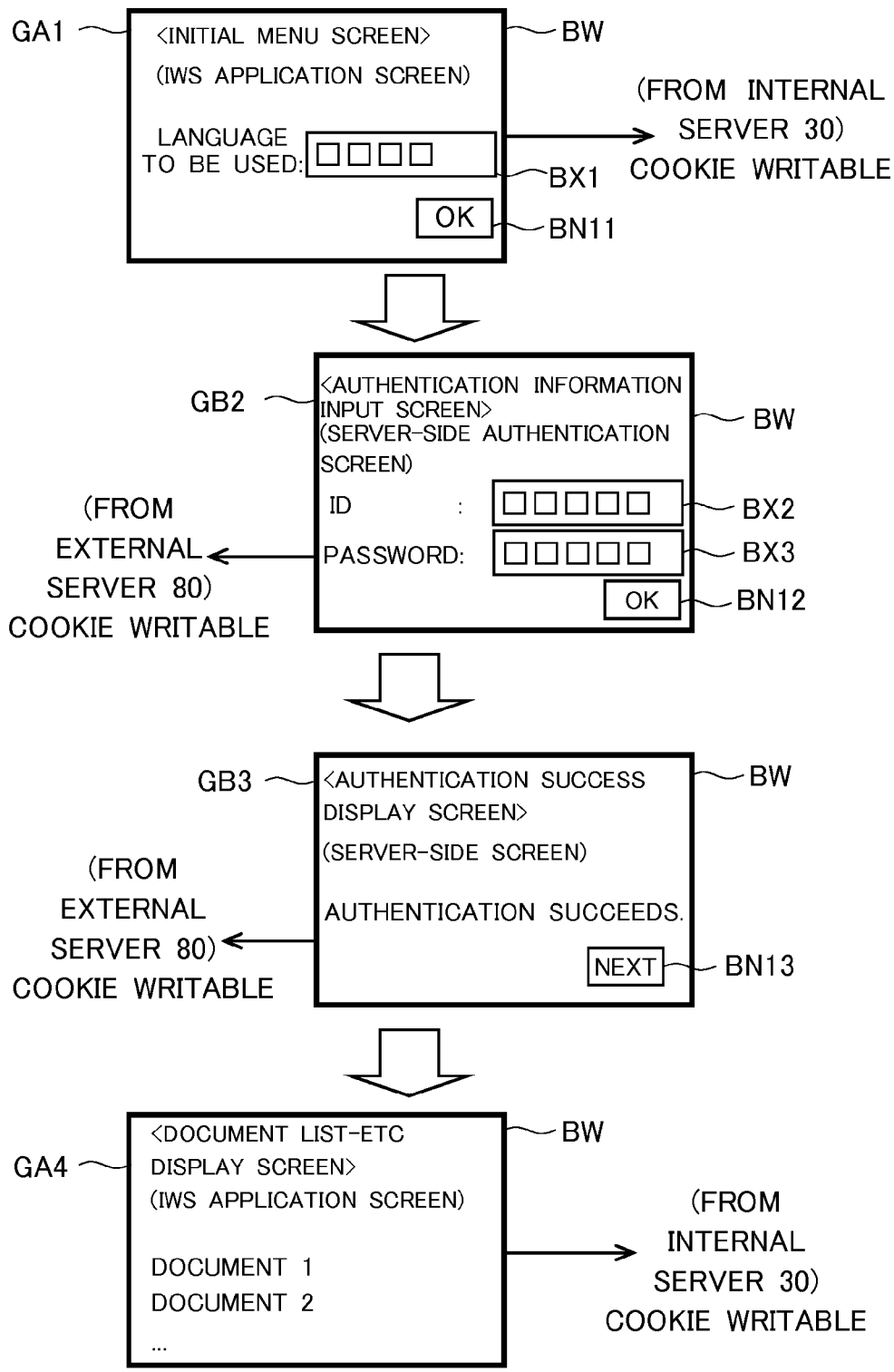
FIG. 7 is a view showing a screen transition and the like in accordance with a second preferred embodiment.

FIG. 7 is a view showing a screen transition and the like in accordance with the second preferred embodiment of the present invention. As shown in FIG. 7, an operation of the second preferred embodiment is similar to that of the first preferred embodiment (see FIG. 6).

As shown in FIG. 7, the same operation as that in the first preferred embodiment is performed until the screen GB3 is displayed.

When the user UA checks in the screen GB3 that the authentication succeeds and then presses the "Next" button BN13 in the screen GB3, like in the first preferred embodiment, in response to the press operation, the application AP1 acquires the "document list information" from the external server 80 and changes the access destination to the internal server 30 shown in the lower portion, to display the screen GA4. In the second preferred embodiment, however, the timing of deleting the cookie CB is different from that in the first preferred embodiment and the delete operation of the cookie CB, with the screen transition to the screen GA4, is not performed.

After that, during the access to the first type of access destination AC1, the cookie CA is written as appropriate in screens after the screen GA4 in response to the cookie write request WQ from the internal server 30.

Then, at some point in time, when the user UA presses a hardware copy button (now shown) provided on the operation panel part 6c and gives a copy instruction, for example, the application AP1 is ended. Further, with the end of the application AP1, the browser BW is ended. Then, the cookie control part 14 deletes the cookie CB immediately after the end of the browser BW. In more detail, on the basis of the discrimination results (the discrimination results of the discrimination part 16) held in association with the cookies CA and CB, the cookie (CB) determined to be stored in response to the cookie write request WQ from the second type of access destination AC2 is deleted. In other words, only the cookie CB among the cookies CA and CB is selectively deleted.

With the above operation, when the application AP1 is performed by other users (UB and the like) after that, it is possible to prevent the information (e.g., the authentication information and the like) stored in the cookie CB from being used by the other users (UB and the like) since no cookie CB remains. In other words, in the case where the cookie CB from the external server 80 is shared by a plurality of users, it is possible to perform an appropriate user management.

Further, the cookie CB from the second type of access destination, among the cookie CA from the first type of access destination and the cookie CB from the second type of access destination, is selectively deleted. Therefore, it is possible to take careful measures in accordance with the servers of the communication destinations (in more detail, information contents of the cookies determined for the servers of the communication destinations).

Furthermore, in the operation of the second preferred embodiment, when the user UA uses the application AP1, the cookie CB continues to be stored until the browser is ended even after the access destination is returned from the second type of access destination AC2 to the first type of access destination AC1. Therefore, the user UA can use the information in the cookie CB until the browser is ended even after the access destination is returned from the second type of access destination AC2 to the first type of access destination AC1. When the user UA continues to use the application AP1 after the access destination is returned to the first type of access destination AC1, since the information for the user UA stored in the cookie CB can be used by the application AP1 and the external server 80 as necessary, it is possible to reduce the effort for inputting the information again.

<3. The Third Preferred Embodiment>

In the above preferred embodiments, as an example, the case has been discussed where the write operation on the cookie CB is performed in response to the cookie write request WQ from the second type of access destination AC2 and the cookie CB which is once written into the MFP 10 by the write operation is deleted at a predetermined timing after the access to the second type of access destination AC2 is ended.

In the third preferred embodiment, as an example, a case will be discussed where during the use of the MFP 10 by the user UA, when the cookie write request WQ from the second type of access destination AC2 is received, the MFP 10 rejects the cookie write request and does not perform the write operation on the cookie CB. In this case, when other users (UB and the like) use the MFP 10 after that, no cookie CB exists and it is possible to prevent the information (e.g., the authentication information and the like) in the cookie CB from being used by the other users (UB and the like).

The third preferred embodiment is a variation of the first preferred embodiment, and the following discussion will be centered on the difference from the first preferred embodiment.

Figure 8:
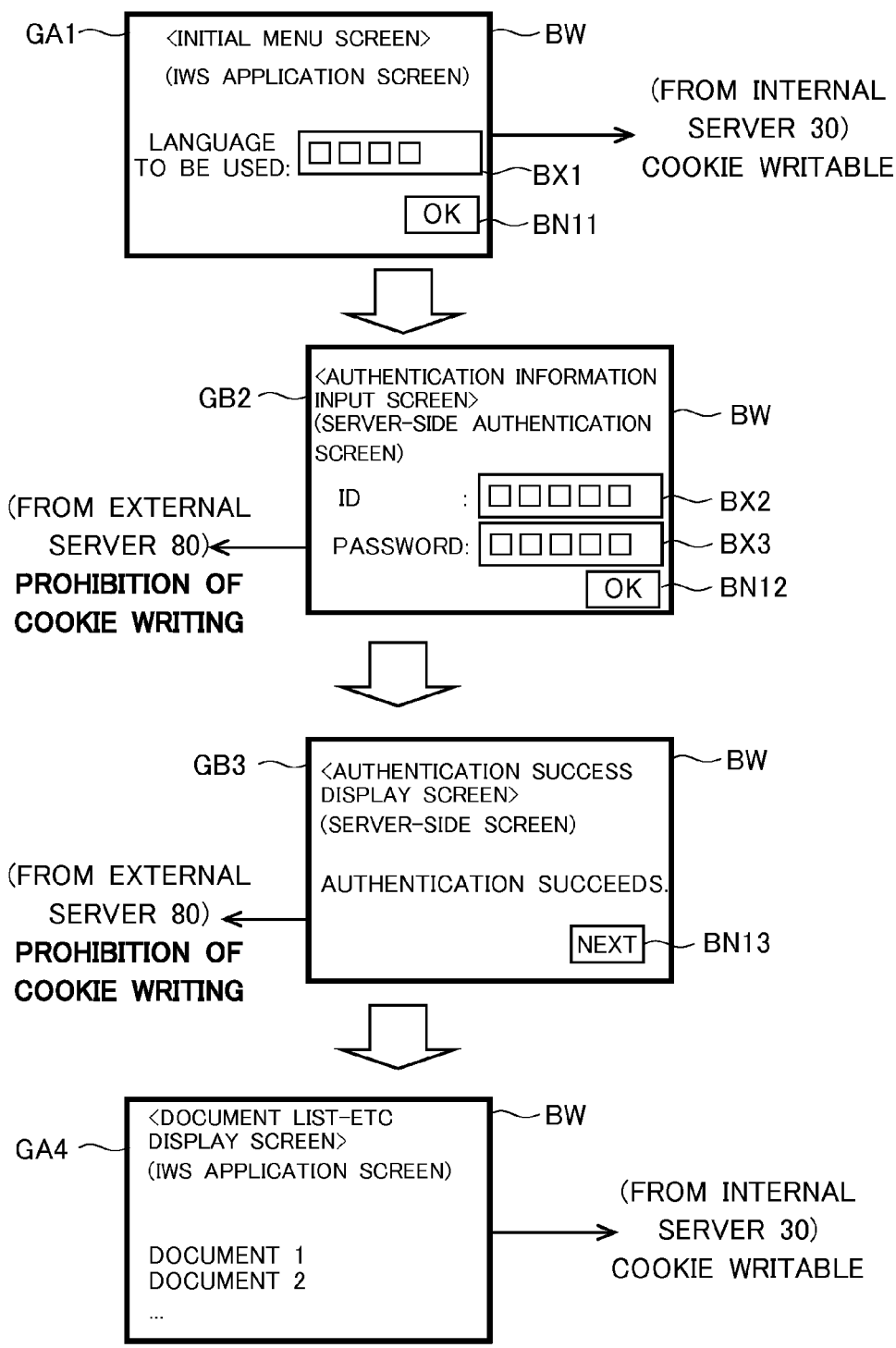
FIG. 8 is a view showing a screen transition and the like in accordance with a third preferred embodiment.

FIG. 8 is a view showing a screen transition and the like in accordance with the third preferred embodiment of the present invention. As shown in FIG. 8, an operation of the third preferred embodiment is similar to that of the first preferred embodiment (see FIG. 6). The third preferred embodiment, however, is different from the first preferred embodiment in that during the display of the screen GB (GB2, GB3, and the like) (in other words, during the access to the second type of access destination AC2), the write request WQ for the cookie CB from the external server 80 is rejected (the write of the cookie CB is prohibited) and the cookie CB is not written. Further, during the display of the screen GA (GA1, GA4, and the like) (in other words, during the access to the first type of access destination AC1), like in the first preferred embodiment, the write request WQ for the cookie CA from the internal server 30 is received and the write operation of the cookie CA is performed.

First, during the display of the screen GA1 (the screen on the top stage in FIG. 8), the cookie write request WQ is determined to be sent from the internal server 30. Then, the write request WQ for the cookie CA from the internal server 30 is received and the write operation of the cookie CA is performed.

After that, during the display of the next screen GB2, the cookie write request WQ received during the display is determined to be sent from the external server 80. Then, the write request WQ for the cookie CB from the external server 80 is rejected and the write of the cookie CB is prohibited (the write operation of the cookie CB is not performed). Further, also during the display of the screen GB3, similarly, the write request WQ for the cookie CB from the external server 80 is rejected and the write of the cookie CB is prohibited (the write operation of the cookie CB is not performed).

Then, after the access destination is changed from the second type of access destination AC2 to the first type of access destination AC1, during the display of the screen GA (GA4 and the like), the write request WQ for the cookie CA from the internal server 30 is received and the write operation of the cookie CA is performed.

In the above operation, when the cookie control part 14 determines the cookie write request WQ to be sent from the second type of access destination AC2, the cookie control part 14 rejects the cookie write request WQ and does not perform the write operation of the cookie CB. Therefore, even when the other users (UB and the like) uses the MFP 10, no cookie CB exists and it is possible to prevent the information (e.g., the authentication information and the like) stored in the cookie CB from being used by the other users (UB and the like). In other words, in the case where the cookie CB from the external server 80 is shared by a plurality of users, it is possible to perform an appropriate user management.

Further, the cookie CB from the second type of access destination, among the cookie CA from the first type of access destination and the cookie CB from the second type of access destination, is selectively rejected. Therefore, it is possible to take careful measures in accordance with the servers of the communication destinations (in more detail, information contents of the cookies determined for the servers of the communication destinations).

<4. The Fourth Preferred Embodiment>

In the first and second preferred embodiments, as an example, the case has been discussed where the cookie CB which is once stored is deleted at a predetermined timing (referred to also as a case where control is made by a first control method CM1 (referred to also as a first control technique CM1)), and on the other hand, in the third preferred embodiment, as an example, the case has been discussed where the write request for the cookie CB itself is rejected (referred to also as a case where control is made by a second control method CM2 (referred to also as a second control technique CM2)). More specifically, the first control method CM1 is a control where the cookie CB which is once written in response to the cookie write request WQ from the second type of access destination AC2 is deleted at a predetermined timing after the access to the second type of access destination AC2 is ended. The second control method CM2 is a control where when the cookie write request WQ is determined to be sent from the second type of access destination AC2, the cookie write request WQ is rejected.

In the same apparatus 10, two types of control methods CM1 and CM2 may be selectively used in accordance with a plurality of programs AP. In the fourth preferred embodiment, such a case will be discussed.

Specifically, when a plurality of applications AP1, AP2, and the like are registered, the response to the cookie write request WQ from the second type of access destination AC2 may be changed for each application. There may be a case, for example, where the control in accordance with the first control method CM1 (the control shown in the first or second preferred embodiment, or the like) is performed with respect to the first application AP1 and the control in accordance with the second control method CM2 (the control shown in the third preferred embodiment, or the like) is performed with respect to the second application AP2. Alternatively, there may be another case, conversely, where the control in accordance with the second control method CM2 is performed with respect to the first application AP1 and the control in accordance with the first control method CM1 is performed with respect to the second application AP2.

FIG. 9 is a view showing a data table TB specifying a control method (referred to also as a control technique) to be adopted for each application AP. The data table TB is stored in a data table storage part 5b (see FIG. 2).

The data table TB of FIG. 9 specifies that the first control method CM1 should be used for the application AP1 and the second control method CM2 should be used for the application AP2. Thus, in the data table TB, the first control method CM1 and the second control method CM2 are selectively specified as a control method to be performed for each of a plurality of applications.

Then, when the cookie write request WQ is determined to be sent from the second type of access destination AC2, the cookie control part 14 selectively uses a control method registered in the data table TB in association with the application AP being executed (among a plurality of applications), to perform the processing on the cookie.

When the first control method CM1 among the first control method CM1 and the second control method CM2 is registered in the data table TB in association with the application AP1 being executed, for example, the first control method CM1 is selectively used for the application AP1 being executed, to perform the processing on the cookie.

Further, when the second control method CM2 among the first control method CM1 and the second control method CM2 is registered in the data table TB in association with the application AP2 being executed, for example, the second control method CM2 is selectively used for the application AP2 being executed, to perform the processing on the cookie.

In such a manner, the two control methods CM1 and CM2 may be selectively used for each application.

<5. Variations>

Though the preferred embodiments of the present invention have been discussed above, the present invention is not limited to the above-discussed preferred embodiments.

In the first and second preferred embodiments, for example, though a discrimination process is performed by the discrimination part 16 every time when each of the cookies CA and CB is stored, this is one exemplary case. The discrimination process on whether the write request for each of the cookies CA and CB is sent from the first type of access destination or the second type of access destination may be performed by the discrimination part 16 on the basis of the URL information stored in the plurality of cookies CA and CB at a predetermined timing after the access to the second type of access destination AC2 is ended. Then, on the basis of the discrimination result, the cookie control part 14 may selectively delete the cookie (CB) which is determined to be stored in response to the cookie write request WQ from the second type of access destination AC2.

Further, in the above-discussed preferred embodiments, though the case has been discussed as an example where the access to the first type of access destination AC1 is first performed and then the access to the second type of access destination AC2 is performed, this is one exemplary case. There may be a case, conversely, for example, where the access to the second type of access destination AC2 is first performed and then the access to the first type of access destination AC1 is performed. Also in this case, the same operation as those in the preferred embodiments may be performed on the cookie write request WQ from the second type of access destination AC2.

Furthermore, in the first and second preferred embodiments, the case has been discussed as an example where when the cookie write request WQ is determined to be sent from the second type of access destination AC2, all the target cookies CB are deleted at a predetermined timing.

The present invention is not limited to this case, however, when the target cookie CB of the cookie write request WQ is determined not to include the security information, even if the cookie write request WQ is sent from the second type of access destination AC2, the delete operation of the target cookie CB may not be performed at the predetermined timing.

Though the above-discussed preferred embodiments, for example, are based on the premise that the specification of the cookie CB is not disclosed, in a case where the specification of the cookie CB (the contents of the cookie information) is disclosed, or the like, the response to the cookie write request WQ may be changed in accordance with the contents of the cookie information.

More specifically, when it is disclosed in advance that the cookie CB includes the security information (the authentication information or the like), like in the third preferred embodiment, the MFP 10 may reject the write request WQ for the cookie CB and may not perform the write operation of the cookie CB. On the other hand, when it is disclosed in advance that the cookie CB does not include predetermined information (the authentication information or the like) (for example, the cookie CB indicates display layout mode information (normal mode, frame mode, or the like), the MFP 10 may perform the write operation of the cookie CB in response to the write request WQ for the cookie CB.

In this case, when the information in the cookie CB has no problem if the information is shared by a plurality of users (when the information is not security information, or the like), the cookie CB is not deleted and the information in the cookie CB can be shared by a plurality of users. On the other hand, when the information in the cookie CB has some problem if the information is shared by a plurality of users (when the information is security information, or the like), the cookie CB is deleted at a predetermined timing and it is possible to prevent the information in the cookie CB from being shared by a plurality of users.

Further, in the third preferred embodiment, the case has been discussed as an example where the cookie write request WQ is determined to be sent from the second type of access destination AC2, the cookie write request WQ is always rejected and the write operation of the cookie CB is not preformed.

The present invention is not limited to this case, however, and when the cookie CB is determined not to include the security information, even if the cookie write request WQ is sent from the second type of access destination AC2, the cookie write request WQ may be permitted and the write operation of the target cookie CB may be performed.

For example, as discussed above, in the case where the specification of the cookie CB (the contents of the cookie information) is disclosed, or the like, the response to the cookie write request WQ may be changed in accordance with the contents of the cookie information.

More specifically, when it is disclosed in advance that the cookie CB includes the security information (the authentication information or the like), like in the first or second preferred embodiment, the MFP 10 rejects the write request WQ for the cookie CB and does not perform the write operation of the cookie CB. On the other hand, when it is disclosed in advance that the cookie CB does not include security information (the authentication information or the like) (for example, the cookie CB indicates display layout mode information (normal mode, frame mode, or the like), the MFP 10 may perform the write operation of the cookie CB in response to the write request WQ for the cookie CB.

In this case, when the information to be written into the cookie CB has no problem if the information is shared by a plurality of users, the write request WQ for the cookie CB may not be rejected and the information may be written into the cookie CB, and the information can be shared by a plurality of users. On the other hand, when the information to be written into the cookie CB has some problem if the information is shared by a plurality of users, since the write request WQ for the cookie CB is rejected and the write operation of the cookie CB is not performed, it is possible to prevent the information in the cookie CB from being shared by a plurality of users.

In the above-discussed preferred embodiments, though the internal server 30 is taken as an example of the first type of access destination, the first type of access destination is not limited to the internal server 30. An external server (an intra-company server or the like which is an external server of the MFP 10) which is first connected via the browser BW by an application APi may be registered as the first type of access destination. In more detail, a URL (e.g., URL including a domain name such as "www.***.co.jp") of the intra-company server may be registered in the MFP 10 in advance as the first type of access destination. Especially, in a case where the cookie CA for which a write request is sent from the intra-company server or the like does not have security information (authentication information or the like), or the like, the intra-company server may be registered as the first type of access destination AC1, the normal cookie control process CT1 may be performed for the cookie CA, and the cookie CA may be shared by a plurality of users. Further, especially, in a case where the cookie CA for which a write request is sent from the intra-company server or the like holds therein predetermined information for each user, or the like, the intra-company server may be registered as the first type of access destination AC1, the normal cookie control process CT1 may be performed for the cookie CA, and the cookie CA may be shared by a plurality of users. In more detail, when each user uses the MFP 10, information for the corresponding user may be extracted out of pieces of information for the users, which are stored in the cookie CA.

While the invention has been shown and described in detail, the foregoing description is in all aspects illustrative and not restrictive. It is therefore understood that numerous modifications and variations can be devised without departing from the scope of the invention.

What is claimed is:

1. An information processing apparatus capable of displaying information acquired by accessing a web server, by using a web browser, comprising:

a registration part for registering a first type of access destination;

a communication control part for receiving a cookie write request from an access destination accessed by said web browser;

a discrimination part for discriminating whether said cookie write request is sent from said first type of access destination or from a second type of access destination which is an access destination corresponding to a domain which is different from a domain of an access destination registered as said first type of access destination in advance; and a cookie control part for controlling processing on a cookie shared by a plurality of users in accordance with a discrimination result of said discrimination part, wherein said cookie control part performs write operation of a predetermined cookie in response to said cookie write request when said cookie control part receives said cookie write request from said second type of access destination, and said cookie control part deletes said predetermined cookie which is once written into said information processing apparatus by said write operation, at a timing when access to said second type of access destination is ended with access transition from said second type of access destination to said first type of access destination.

2. The information processing apparatus according to claim 1, wherein said registration part registers said first type of access destination prior to start of execution of an application for accessing said first type of access destination and said second type of access destination by using said web browser, and said communication control part receives said cookie write request from an access destination accessed by said web browser during execution of said application.

3. The information processing apparatus according to claim 1, wherein a cookie to be stored in response to a write request from said first type of access destination is a cookie for holding therein first information for each user, and a cookie to be stored in response to a write request from said second type of access destination is a cookie for holding therein second information in no distinction of user.

4. The information processing apparatus according to claim 3, wherein said first information is non-security information, and
said second information is security information.

5. The information processing apparatus according to claim 1, wherein said first type of access destination is an internal server which is a web server provided inside said information processing apparatus, and said second type of access destination is an external server which is a web server provided outside said information processing apparatus.

6. The information processing apparatus according to claim 1, wherein even if said cookie write request is a request from said second type of access destination, when a target cookie of said cookie write request is determined not to include security information, said cookie control part does not perform delete operation of said target cookie at said timing, and when said cookie write request is a request from said second type of access destination and a target cookie of said cookie write request is determined to include security information, said cookie control part performs delete operation of said target cookie at said timing.

7. A non-transitory computer-readable recording medium for recording therein a program to be executed by a computer embedded in an information processing apparatus which is capable of displaying information acquired by accessing a web server, by using a web browser, to cause said computer to perform the steps of:

a) receiving a cookie write request from an access destination accessed by said web browser;

b) discriminating whether said cookie write request is sent from a first type of access destination or from a second type of access destination which is an access destination corresponding to a domain which is different from a domain of an access destination registered as said first type of access destination in advance; and c) controlling processing on a cookie shared by a plurality of users in accordance with a discrimination result in said step b), wherein said step c) has the steps of:

c-1) executing write operation of a predetermined cookie in response to a cookie write request when said cookie write request is received from said second type of access destination; and c-2) deleting said predetermined cookie which is once written into said information processing apparatus by said write operation, at a timing when access to said second type of access destination is ended with access transition from said second type of access destination to said first type of access destination.

8. An information processing apparatus capable of displaying information acquired by accessing a web server, by using a web browser, comprising:

a registration part for registering a first type of access destination;

a communication control part for receiving a cookie write request from an access destination accessed by said web browser;

a discrimination part for discriminating whether said cookie write request is sent from said first type of access destination or from a second type of access destination which is an access destination corresponding to a domain which is different from a domain of an access destination registered as said first type of access destination in advance; and a cookie control part for controlling processing on a cookie shared by a plurality of users in accordance with a discrimination result of said discrimination part, wherein said cookie control part rejects said cookie write request when said cookie write request is determined to be sent from said second type of access destination and a cookie to be stored in response to said cookie write request is a cookie for holding therein second information in no distinction of user, and wherein said cookie control part accepts said cookie write request when said cookie write request is determined to be sent from said first type of access destination and a cookie to be stored in response to said cookie write request is a cookie for holding therein first information for each user.

9. The information processing apparatus according to claim 8, wherein said registration part registers said first type of access destination prior to start of execution of an application for accessing said first type of access destination and said second type of access destination by using said web browser, and said communication control part receives said cookie write request from an access destination accessed by said web browser during execution of said application.

10. The information processing apparatus according to claim 8, wherein said first information is non-security information, and said second information is security information.

11. The information processing apparatus according to claim 8, wherein said first type of access destination is an internal server which is a web server provided inside said information processing apparatus, and said second type of access destination is an external server which is a web server provided outside said information processing apparatus.

12. An information processing apparatus capable of displaying information acquired by accessing a web server, by using a web browser, comprising:

a registration part for registering a first type of access destination;

a communication control part for receiving a cookie write request from an access destination accessed by said web browser;

a discrimination part for discriminating whether said cookie write request is sent from said first type of access destination or from a second type of access destination which is an access destination corresponding to a domain which is different from a domain of an access destination registered as said first type of access destination in advance; and a cookie control part for controlling processing on a cookie shared by a plurality of users in accordance with a discrimination result of said discrimination part, wherein said cookie control part rejects said cookie write request when said cookie write request is determined to be sent from said second type of access destination, and said cookie control part accepts said cookie write request when said cookie write request is determined to be sent from said first type of access destination, wherein a cookie to be stored in response to a write request from said first type of access destination is a cookie for holding therein first information for each user, wherein a cookie to be stored in response to a write request from said second type of access destination is a cookie for holding therein second information in no distinction of user, wherein even if said cookie write request is a request from said second type of access destination, when a target cookie of said cookie write request is determined not to include security information, said cookie control part does not reject said cookie write request and perform write operation of said target cookie, and wherein when said cookie write request is a request from said second type of access destination and a target cookie of said cookie write request is determined to include security information, said cookie control part rejects said cookie write request and does not perform write operation of said target cookie.

13. A non-transitory computer-readable recording medium for recording therein a program to be executed by a computer embedded in an information processing apparatus which is capable of displaying information acquired by accessing a web server, by using a web browser, to cause said computer to perform the steps of:

a) receiving a cookie write request from an access destination accessed by said web browser;

b) discriminating whether said cookie write request is sent from a first type of access destination or from a second type of access destination which is an access destination corresponding to a domain which is different from a domain of an access destination registered as said first type of access destination in advance; and c) controlling processing on a cookie shared by a plurality of users in accordance with a discrimination result in said step b), wherein said step c) has the steps of:

c-1) rejecting said cookie write request when said cookie write request is determined to be sent from said second type of access destination and a cookie to be stored in response to said cookie write request is a cookie for holding therein second information in no distinction of user, and c-2) accepting said cookie write request when said cookie write request is determined to be sent from said first type of access destination and a cookie to be stored in response to said cookie write request is a cookie for holding therein first information for each user.

14. An information processing apparatus capable of displaying information acquired by accessing a web server, by using a web browser, comprising:

a registration part for registering a first type of access destination;

a communication control part for receiving a cookie write request from an access destination accessed by said web browser;

a discrimination part for discriminating whether said cookie write request is sent from said first type of access destination or from a second type of access destination which is an access destination corresponding to a domain which is different from a domain of an access destination registered as said first type of access destination in advance;

a cookie control part for controlling processing on a cookie shared by a plurality of users in accordance with a discrimination result of said discrimination part; and a storage part for storing a data table which selectively specifies a first control technique and a second control technique as a control technique to be executed correspondingly to each of a plurality of applications using said web browser, wherein said first control technique is a control to perform write operation of a predetermined cookie in response to said cookie write request when said cookie write request from said second type of access destination is received, and to delete said predetermined cookie which is once written into said information processing apparatus by said write operation, at a timing when access to said second type of access destination is ended with access transition from said second type of access destination to said first type of access destination, said second control technique is a control to reject said cookie write request when said cookie write request is determined to be a request from said second type of access destination, and said cookie control part performs processing on said cookie by selectively using a control technique registered in said data table in association with an application being executed, among said first control technique and said second control technique, when said cookie write request is determined to be sent from said second type of access destination.

15. The information processing apparatus according to claim 1, wherein the cookie control part performs a second write operation of a predetermined cookie in response to the cookie write request when the cookie control part receives the cookie write request from the first type of access destination, and the cookie control part does not delete the predetermined cookie written into the information processing apparatus by the second write operation, at the timing when access to the second type of access destination is ended with access transition from the second type of access destination to the first type of access destination.

* * * * *